March 8, 1966  R. M. SHRADER ETAL  3,238,737
HEATED RECEIVER WINTER CONTROL FOR REFRIGERATION SYSTEMS
Filed March 31, 1964  2 Sheets-Sheet 1
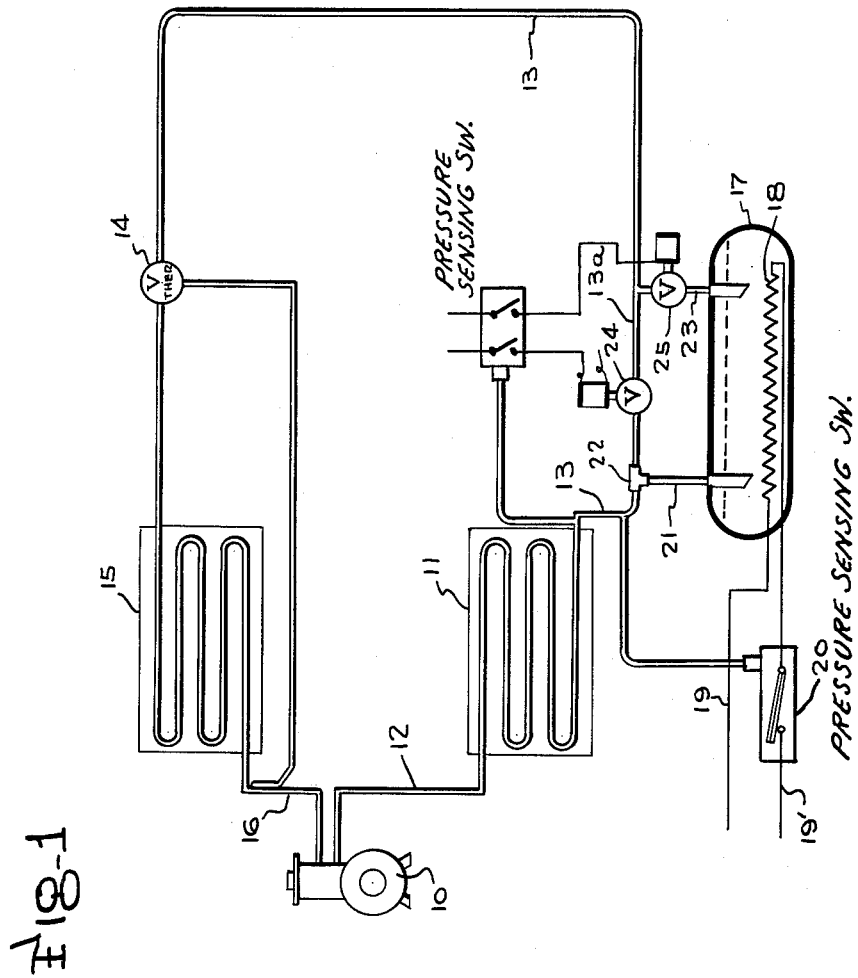
INVENTORS
RAYMOND M. SHRADER, &
WADE KING SIMS
BY Mason, Fenwick & Lawrence
ATTORNEYS

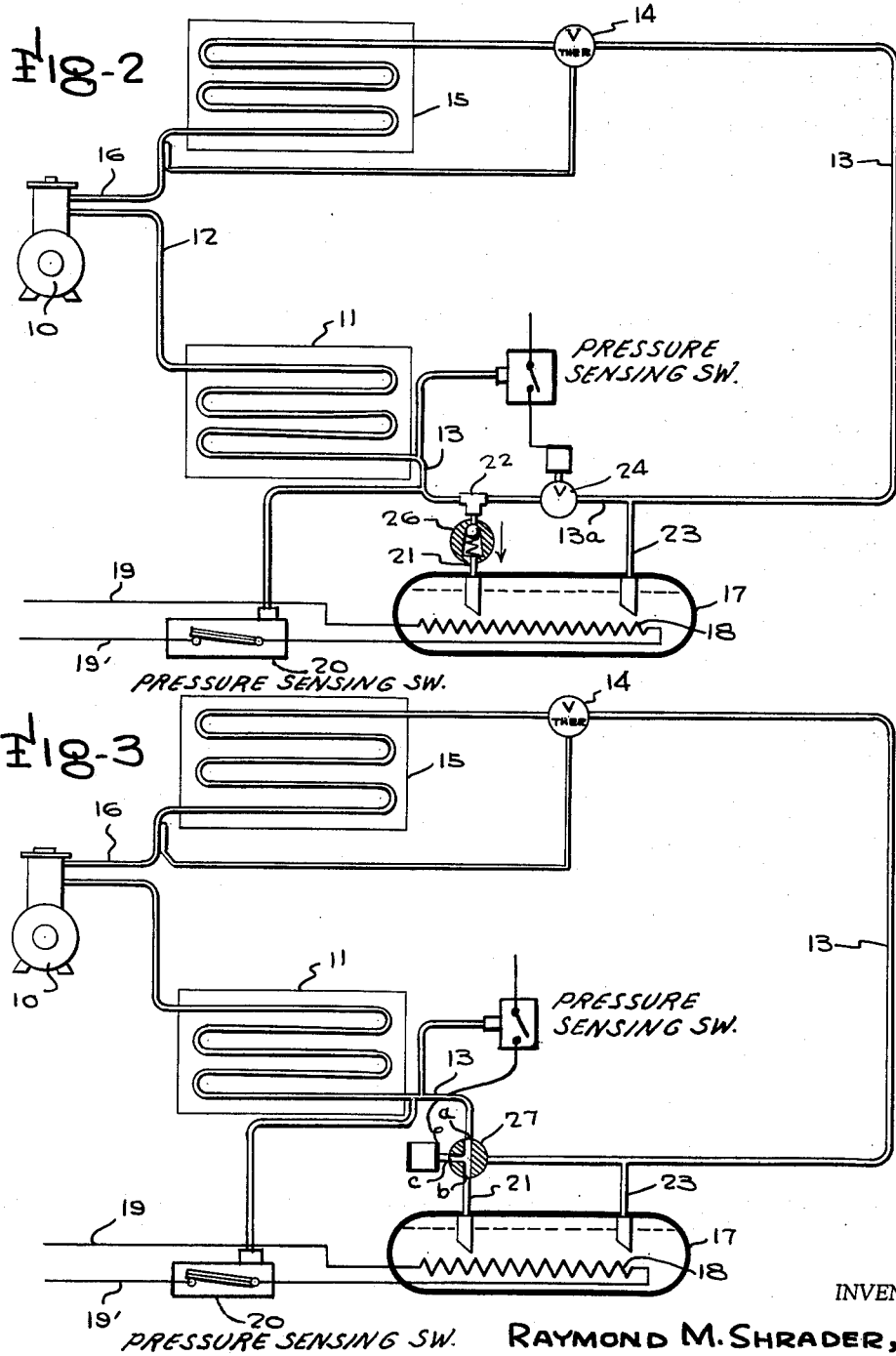

United States Patent Office

3,238,737
Patented Mar. 8, 1966

3,238,737
HEATED RECEIVER WINTER CONTROL FOR
REFRIGERATION SYSTEMS
Raymond M. Shrader and Wade King Sims, Atlanta, Ga.,
assignors to Larkin Coils, Inc., Atlanta, Ga., a corporation of Georgia
Filed Mar. 31, 1964, Ser. No. 356,250
8 Claims. (Cl. 62—174)

The present invention relates in general to head pressure control means for refrigeration systems, and more particularly to refrigeration systems of the type having air cooled condensers, wherein means are provided to seasonably heat liquid refrigerant in the receiver to maintain head pressure at a desired level for efficient operation over a wide range of ambient conditions.

It has been widely recognized in the refrigeration field that wide ranges of variation in ambient temperature make it extremely difficult to maintain efficient refrigeration system operation when air cooled condensers are used. This is because a system which has an appropriately sized condenser for some selected ambient temperature conditions, as for example average summer ambient temperatures, experience severe reduction in head pressure during low winter ambients due to the excessive condensing capacity of the condenser. Attempts to alleviate this problem have included provision of a liquid refrigerant reservoir, connected by a single branch line to the liquid line between the condenser outlet and the thermal expansion valve at the evaporator inlet, with a thermostatically controlled electrical heater in the reservoir to heat the liquid refrigerant in the reservoir when it falls below a selected temperature. The temperature of the refrigerant in the reservoir, and thus the vapor pressure in the reservoir, are maintained at a value corresponding to the pressure desired in the liquid line by operation of the heater. This vapor pressure is reflected at the junction of the liquid and branch lines and, when the compressor is operating, serves to cause the condenser to flood, reducing its effective surface and hence its condensing capacity until a state of equilibrium is reached where, neglecting frictional losses and liquid heads, the pressures at the condenser outlet, reservoir and expansion valve inlet are equal. Once this equilibrium is reached, only such heat as is required to maintain the desired vapor pressure in the reservoir in the face of thermal losses from the receiver need be added to the system.

While such an arrangement is effective in varying the capacity of the condenser in a proper direction to maintain head pressure, it has a significant disadvantage in regard to summer or high ambient operation. Once the normal design temperatures or summer ambient pressures are reached, the reservoir will completely fill with liquid refrigerant unless the pressure in the reservoir is maintained at an unnecessarily high value. When the reservoir becomes thus filled with liquid refrigerant, there is no effective refrigerant reservoir in the system other than the condenser and evaporator coils themselves, the system thus becomes a "critical charge" affair (or receiverless system), which is unsatisfactory for expansion valve operation. If sufficient refrigerant is present in the system to maintain an adequate operating charge and the expansion valve modulates closed, the amount of refrigerant in the evapartor will decrease. This refrigerant then must be stored in the condenser, since there is no storage space left in the filled reservoir, which causes the condenser to slightly flood, or at least flood more than a system having a receiver, due to its higher outlet pressure caused by closing of the expansion valve orifice, and results in the expansion valve assuming objectionable "hunting" characteristics. Thus, the action of such a reservoir to steal refrigerant from the system under these temperature conditions renders the system highly critical to the total amount of charge in it, calling for extreme precision in adjusting the total charge and making the system vulnerable to leaks and the whims of the ordinary refrigeration mechanic.

If one seeks to avoid such refrigerant stealing in such a heated reservoir by maintaining the pressure in the receiver at a level which will always be higher than the condensing pressure for the highest ambient temperature conditions, for example by maintaining receiver temperature always above the temperature corresponding to the maximum attainable condenser outlet pressure the system will obviously operate at unnecessarily high pressures, greatly reducing its efficiency of operation. If the heated reservoir is continuously connected in series in the system, as a receiver, so that all liquid return from the condenser flows through it, excessive electric power would be required to reheat the liquid refrigerant during winter operation.

An object of the present invention, therefore, is the provision of a novel refrigeration system having means automatically responsive to pressure conditions in the system during low ambients to maintain head pressure at satisfactory operating levels, wherein the above-described disadvantages are alleviated.

Another object of the present invention is the provision of a novel refrigeration system having a receiver which acts as a refrigerant heating reservoir during low ambient conditions to maintain head pressure at appropriate levels for proper expansion valve operation and which serves as an unheated series receiver at ambient conditions within a selected design range of the system.

Another object of the present invention is the provision of a novel refrigeration system having a receiver which acts as a refrigerant heating reservoir during low ambient conditions to maintain head pressure at appropriate levels for proper expansion valve operation and which serves as an unheated series receiver during warm ambient temperature seasons.

Another object of the present invention is the provision of a novel refrigeration system having a receiver and a pressure controlled heater therein for heating refrigerant to boost head pressure on the expansion valve during low ambient temperature seasons, wherein means are provided to prevent the receiver from rendering the system highly critical to the total refrigerant charge in the system during summer or warm season ambient temperature conditions.

Other objects, advantages, and capabilities of the present invention will become apparent from the following detail description, taken in conjunction with the accompanying drawings illustrating prefered embodiments of the invention.

In the drawings:

FIGURES 1, 2 and 3 are schematic illustrations of the different refrigeration systems embodying the principles of the present invention.

Referring to the drawings illustrating several changeover refrigeration systems of the systems illustrated includes the basic conventional refrigeration system components of a motor compressor 10, an air cooled condenser 11 receiving hot gaseous refrigerant through discharge line 12 and by heat exchange with ambient air converting the refrigerant to liquid state. The liquid refrigerant flows through liquid line 13 and thermal expansion valve 14 to an evaporator 15, where the refrigerant returns to gaseous state, extracting heat from the zone surrounding the evaporator, and is returned to the compressor 10 through suction line 16. In each illustrated system, a liquid receiver 17 is provided, having an internal electric heater 18 therein supplied with electric current through lines 19, 19', at least one of which is controlled by a pressure sensitive switch 20 (or if desired a temperature sensitive switch) responsive to receiver pressure (or receiver temperature), to complete the supply circuit to the receiver heater 18 for elevating the temperature, and consequently the pressure in the receiver when receiver pressure falls below a selected level.

The various figures of the accompanying drawings show various schemes for connecting the receiver to the liquid line of the system by only a single line when ambient temperatures are sufficiently low to render desirable the availability of head pressure boosting by receiver heating and consequent partial condenser flooding, while connecting the receiver with the liquid line by two connections disposing the receiver "in series" in the system when higher ambient temperature is obtained which may cause the condensing temperature to be higher than the receiver temperature and produce "stealing" of refrigerant by the receiver until the latter fills and places the system in a critical charge state. For convenience, the former or low ambient condition is termed the "winter operation," while the high ambient condition is termed the "summer operation." The system is therefore arranged, in each variation illustrated, to divert all liquid refrigerant from the condenser 11 through the receiver 17 during summer operation to avoid occurrence of a critical charge condition, and to connect the receiver 17 to the system by only one line and a T connection during winter operation so that automatic heating of the receiver will boost head pressure and vary condenser capacity for efficient expansion valve operation as ambient conditions require.

Referring specifically to FIGURE 1, the receiver 17 is connected to the liquid line 13 by a receiver inlet branch line or dip stick 21 joined to the liquid line 13 by a T fitting 22 and forming the receiver liquid connection to the system, and by a receiver outlet branch line or dip stick 23 joining the liquid line 13 downstream from the line 21 and forming what may be termed the receiver "gas" connection to the system. Facility for changeover from winter to summer operation is provided by a solenoid valve 24 in the liquid line portion, herein designated by the reference character 13a extending between the two branch lines 21 and 23, and a solenoid valve 25 in the second branch line or gas connection 23. The solenoids for the valves 24 and 25 may be controlled by manual switches, by thermostatically controlled switches responsive to ambient temperature, or by automatic switches responsive to any other appropriate criteria, to adjust the valves 24, 25 to appropriate conditions for either a "winter" operation made during seasons when low ambient conditions occur which might undesirably reduce head pressure or a "summer" operation made when the ambient conditions are appropriate for ordinary efficient operation of the refrigeration system.

The "winter" operation condition of the FIGURE 1 system, the solenoid valve 24 is open and the solenoid valve 25 is closed, and the receiver heater 18 and its control switch 20 are connected to the electrical supply by suitable control switches. When the ambient temperature at the condenser 11 falls to a level that would cause the condenser capacity to become excessive, this condition is reflected in the system by a drop in condenser outlet pressure and a coincident drop in temperature of the liquid refrigerant leaving the condenser 11. By sensing the pressure, or the temperature if desired, of the refrigerant leaving the condenser, or alternatively the ambient temperature at the condenser, and operating the switch 20 in the supply line to the receiver heater 18, the heater 18 is caused to heat the liquid refrigerant in the receiver 17 to elevate the vapor pressure in the receiver to a selected degree whenever the head pressure, or other criteria sensed, indicates that excessive capacity of the condenser 11 is lowering head pressure. This increased vapor pressure, as previously explained, reflected at the junction of receiver inlet branch line 21 with liquid line 13, causes the condenser 11 to partially flood, reducing its effective surface and hence its condensing capacity until a state of equilibrium is reached at a level adequate to maintain proper expansion valve operation.

If the system continued in this mode during summertime operation, the operating charge could be lost by migration of refrigerant to the receiver 17 as described earlier, placing the system in a critical charge or receiverless mode when the receiver 17 fills, and preventing proper operation of the expansion valve 14. In the present system, the solenoid valve 24 is closed and the valve 25 is opened for summer operation, which has the effect of placing the receiver in series in the liquid line in the same relationship the receiver occupies in conventional refrigeration systems, thus forcing the liquid refrigerant to pass through the receiver in normal fashion. The control of both of these solenoid valve 24, 25 as previously mentioned, may be effected by a pressure sensing switch or a temperature sensing switch which responds to condenser outlet pressures or temperatures, or condenser ambient temperatures, below a selected level to open solenoid valve 24 and close valve 25 to place the system in the "winter" operating mode so that further reductions in condenser outlet pressure or temperature will commence operation of receiver heater 18 to provide outlet pressure for flooding the condenser 11.

In the embodiment illustrated in FIGURE 2, the solenoid valve 25 of the FIGURE 1 embodiment is dispensed with, and instead a spring loaded check valve 26 is interposed in the receiver inlet branch 21 to receiver 17, the solenoid valve 24 being retained in the liquid line portion 13a and the receiver outlet branch 23 being unregulated. The solenoid for valve 24 is preferably regulated by a pressure sensitive switch which responds to rise in compressor discharge pressure above a selected level indicating that ambient temperatures are in the summer operating range, to close valve 24. The spring loaded check valve 26 is adjusted to open when such rise in pressure occurs, which in combination with closed valve 24 insures that the refrigerant flows through the receiver in series relation during summer operation. When the pressure conditions sensed by the control switch for solenoid 24 drop to the winter operation range, valve 24 opens, insuring that the path of least resistance for the refrigerant is through the open valve 24 and thereby by-passing the receiver. In this condition, i.e. with the solenoid valve 24 open and check valve 26 closed, the receiver outlet line 23 acts as the balance line through which is reflected the increased pressure produced when the heater 18 raises the receiver refrigerant temperature to partially flood the condenser 11 and reduce its capacity to restore proper pressure for operation of expansion valve 14.

In the embodiment illustrated in FIGURE 3, a single 3-way solenoid valve 27 is provided at the junction of the receiver inlet branch 21, the receiver outline line 23 being again free of regulation. In this arrangement, the ports a and b of 3-way valve 27 register with the upstream section of liquid line 13 and with receiver inlet branch 21 when the condition to which the control switch for solenoid valve 27 is responsive, as condenser outlet pressure, indicates that ambient temperatures are in the summer operation range. This forces the refrigerant through the receiver 17 in normal series fashion, thus avoiding critical charge problems in the system. When the sensed conditions indicate that ambient temperatures have fallen to the winter operating range, the 3-way solenoid valve 27 is shifted to connect ports a and c with the downstream and upstream sections of the liquid line 13, closing off the receiver inlet branch 21 and placing the system in the same winter operation mode as that described for the FIGURE 2 embodiment. Thus reduction in condenser outlet pressure below the set point for the control for switch 20 will energize the receiver heater 18 to elevate the temperature and pressure of the receiver refrigerant, which reflects through receiver outline line 25 to flood the condenser 11 and restore proper expansion valve operating pressure.

It will be appreciated that in each of the FIGURES 1, 2 and 3 systems the solenoid controlled valves 24, 25 and 27 can be controlled by switches responsive to any desired conditions indicative of factors which serve as a proper criteria, such as by direct monitoring of ambient temperature, or monitoring refrigerant temperature at the condenser outlet, or by manual switches, instead of monitoring condenser outlet pressure. All of the described embodiments, therefore, serve the basic purpose of appropriately connecting a heated refrigerant chamber, which also serves as a receiver, to the system to provide outlet pressure for flooding the condenser during wintertime and to ensure series flow through the receiver during summertime to prevent the loss of operating charge by refrigerant migration to the receiver.

While several preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A refrigeration system adapted for use under a wide variety of ambient condenser temperatures, said system comprising a circuit for refrigerant flow including conduit interconnected compressor, condenser, evaporator and a variable orifice expansion device in operative association with the evaporator inlet, a liquid line interconnecting the condenser outlet with said expansion device, a refrigerant receiver having electrical heater means therein for elevating the temperature and pressure in said receiver upon energization of the heater means, switch means having means responsive to refrigerant pressure conditions in a portion of the system from the condenser outlet to the receiver to detect occurrence of receiver pressure below a selected level and energize said heater means, a first liquid passage connecting said receiver with said liquid line for passage of liquid refrigerant therebetween, a second liquid passage connecting said receiver with said liquid line at a point relatively more remote from the condenser outlet than said first passage for passage of liquid refrigerant therethrough, valve means having valve members in at least one of said passages and in said liquid line movable to open and closed positions for controlling liquid flow therethrough, said valve members having a first set of flow regulating positions closing the portion of said liquid line between said passages against liquid flow therethrough when both of said passages are open to dispose said receiver in series flow relation between said condenser and expansion device during occurrence of a relatively higher range of ambient temperatures, and said valve members also having a second set of flow regulating positions closing one of said passages and opening said liquid line between said passages wherein the other passage forms a single line connection between the receiver and liquid line for passage of liquid refrigerant therebetween in either direction to permit liquid refrigerant to back up in said condenser and partially flood the same upon energization of said heater means and insure maintenance of condensing pressure above a selected minimum during occurrence of low ambient temperature conditions in a range which would depress condensing pressure below the selected minimum.

2. A refrigeration system as defined in claim 2, wherein said second liquid passage is continuously open, said valve means comprising a three-way valve at the juncture of said first passage and liquid line for controlling said first passage and said liquid line, said three-way valve having a first flow regulating position closing the portion of said liquid line between said passages against liquid flow therethrough and opening said first passage to dispose said receiver in series flow relation between said condenser and expansion device during occurrence of a relatively higher range of ambient temperatures, and said three-way valve having a second flow regulating position closing said first passage and opening said liquid line between said passages whereby said second passage forms a single line connection between the receiver and liquid line for passage of liquid refrigerant therebetween in either direction to permit liquid refrigerant to back up in said condenser and partially flood the same upon energization of said heater means and insure maintenance of condensing pressure above a selected minimum during occurrence of low ambient temperature conditions in a range which would depress condensing pressure below the selected minimum.

3. A refrigeration system as defined in claim 2, wherein said second liquid passage is continuously open, said valve members including a first valve in said first passage and a second valve in said liquid line between said passages, said valves having a first flow regulating position closing the portion of said liquid line between said passages against liquid flow therethrough and opening both of said passages to dispose said receiver in series flow relation between said condenser and expansion device during occurrence of a relatively higher range of ambient temperatures, and said valves having a second flow regulating position closing said first passage and opening said liquid line between said passages wherein the second passage forms a single line connection between the receiver and liquid line for passage of liquid refrigerant therebetween in either direction to permit liquid refrigerant to back up in said condenser and partially flood the same upon energization of said heater means and insure maintenance of condensing pressure above a selected minimum during occurrence of low ambient temperature conditions in a range which would depress condensing pressure below the selected minimum.

4. A refrigeration system as defined in claim 3, wherein said first valve is a check valve which is spring-biased to closed position and is responsive to pressures in the liquid line at the condenser outlet exceeding a selected level signifying ambient temperatures in said relatively higher range to open said first passage.

5. A refrigeration system as defined in claim 2, wherein said first liquid passage is continuously open, said valve members including a first valve in said second passage and a second valve in said liquid line between said passages, said valves having a first flow regulating position closing the portion of said liquid line between said passages against liquid flow therethrough and opening said second passage to dispose said receiver in series flow relation between said condenser and expansion device during occurrence of a relatively higher range of ambient temperatures, and said valves also having a second flow regulating position closing said second passage and opening said liquid line between said passages wherein the first passage forms a single line connection between the receiver and liquid line for passage of liquid refrigerant therebetween in either direction to permit liquid refrigerant to back up in said condenser and partially flood the same upon energization of said heater means and insure maintenance of condensing pressure above a selected minimum during occurrence of low ambient temperature conditions in a range which would depress condensing pressure below the selected minimum.

6. A refrigeration system as defined in claim 2, wherein said three-way valve is controlled by ambient temperature sensing switch means to condition the valve to said first and second flow regulating positions upon occurrence of ambient temperatures in selected higher and lower temperature ranges.

7. A refrigeration system as defined in claim 3, wherein said valves are controlled by ambient temperature sensing switch means to condition the valves to said first and second flow regulating positions upon occurrence of ambient temperatures in selected higher and lower temperature ranges.

8. A refrigeration system as defined in claim 5, wherein said valves are controlled by ambient temperature sensing switch means to condition the valves to said first and second flow regulating positions upon occurrence of ambient temperatures in selected higher and lower temperature ranges.

References Cited by the Examiner

UNITED STATES PATENTS

| | | | |
|---|---|---|---|
| 2,359,595 | 10/1944 | Urban | 62—174 |
| 2,949,750 | 8/1960 | Kramer | 62—196 |
| 3,064,445 | 11/1962 | Gertus | 62—174 |
| 3,145,543 | 8/1964 | Miner | 62—149 |

ROBERT A. O'LEARY, *Primary Examiner.*

W. E. WAYNER, *Assistant Examiner.*